United States Patent [19]

Nikkanen et al.

[11] Patent Number: 4,493,184

[45] Date of Patent: Jan. 15, 1985

[54] PRESSURIZED NACELLE COMPARTMENT FOR ACTIVE CLEARANCE CONTROLLED GAS TURBINE ENGINES

[75] Inventors: John P. Nikkanen; James G. Griffin, both of West Hartford, Conn.

[73] Assignee: United Technologies Corporation, Hartford, Conn.

[21] Appl. No.: 472,917

[22] Filed: Mar. 7, 1983

[51] Int. Cl.³ ............................................... F02C 7/18
[52] U.S. Cl. .................................... 60/204; 60/226.1; 60/266; 60/39.07; 60/39.75; 60/39.83; 415/116
[58] Field of Search ................... 60/39.091, 266, 39.1, 60/226.1, 263, 204, 39.07, 39.83, 39.094, 39.75; 415/116, 128

[56] References Cited

U.S. PATENT DOCUMENTS 2,853,854  9/1958  Avery et al. ........................ 60/264
3,058,302 10/1962  Kuzyk ................................. 60/263
4,163,366  8/1979  Kent .................................. 60/39.094
4,232,513 11/1980  Pearson et al. ..................... 60/226.1
4,304,093 12/1981  Schulze ............................. 60/39.07

Primary Examiner—Louis J. Casaregola
Assistant Examiner—Jeffrey A. Simenauer
Attorney, Agent, or Firm—Robert C. Walker

[57] ABSTRACT

Methods and apparatus for improving the thrust specific fuel consumption (TSFC) of a gas turbine engine employing an exterior active clearance control system are disclosed.

The pressure within the nacelle compartment to which active clearance control air is discharged is operated under altitude cruise conditions at a level on the order of one to two and one-half pounds per square inch (1–2½ psi) above the ambient atmosphere. Flow discharging from the nacelle is directed through an aft facing vent nozzle for purposes of thrust recovery.

4 Claims, 6 Drawing Figures

PRESSURIZED NACELLE COMPARTMENT FOR ACTIVE CLEARANCE CONTROLLED GAS TURBINE ENGINES

DESCRIPTION

1. Technical Field

This invention relates to aircraft gas turbine engine installations, and more particularly to the subsequent utilization of nacelle compartment ventilation air.

The concepts were developed for use with large turbofan engines of the twenty to sixty thousand pound (20,000–60,000 lb) thrust class, but have wider applicability to other engines as well.

2. Background Art

Gas turbine engines of the type to which the present concepts apply are housed on an aircraft within an aerodynamic fairing referred to as the engine nacelle. The nacelle covers engine components mounted externally of the engine case, principally to reduce aerodynamic drag otherwise initiated by such components and to protect such components. The nacelle compartment is ventilated to prevent excessive heating of the components located therein and to prevent the buildup of volatile gases within the nacelle compartment in the unlikely event of leaks from fuel manifolding.

Historically, air flows to the nacelle compartment from three principal sources: component dedicated cooling air which is subsequently discharged into the compartment, core engine air unavoidably leaking across engine case flanges and into the nacelle compartment, and fan duct air leaking into the nacelle compartment through compartment door seals at the upstream end of the nacelle. In most installations the nacelle compartment is naturally vented of such air through gaps in the nacelle fairing at the downstream end of the nacelle compartment. Little attention has been paid in the past to the actual pressure of the air flowing through the nacelle compartment as long as the flow rate of such air was sufficient to adequately ventilate the compartment.

Recent commercial aircraft gas turbine engines, such as the JT9D-7R4 engine manufactured by Pratt & Whitney Aircraft, Division of United Technologies Corporation, have incorporated clearance control systems operative on a large segment of the engine to closely match thermal growth of the stator elements to that of the rotor elements. Principally, cooling or heating air is squirted onto the exterior of the engine case of the segment to be controlled. Desired contraction or expansion occurs. U.S. Pat. Nos. 4,069,662 to Redinger et al entitled "Clearance Control for Gas Turbine Engine"; 4,019,320 to Redinger et al entitled "External Gas Turbine Engine Cooling for Clearance Control"; and 4,279,123 to Griffin et al entitled "External Gas Turbine Engine Cooling for Clearance Control" are representative of the concepts employed in systems of the external type.

Such external active clearance control systems utilize low pressure cooling air ducted from the fan stream of the engine to manifolding surrounding the region of the case to be cooled. The ducted cooling air is discharged from the manifold and directed so as to impinge where possible directly on the engine case. Combined impingement and convection cooling of the engine case result. Designs having such systems have heretofore required very low back pressures within the nacelle compartment in order that flow discharging from the manifold may be accelerated to the highest possible velocity for effective impingement cooling of the case. Back pressures on the order of one-half pound per square inch ($\frac{1}{2}$ psi) above the ambient pressure to which the nacelle compartment is ventilated have been obtained through adequately sized gaps in the nacelle fairing at the downstream end of the nacelle compartment. Flow rates on the order of three to four pounds per second (3–4 pps) through the nacelle compartment are typical and flow leakage areas on the order of one hundred square inches (100 in$^2$) are needed to maintain the desired low nacelle compartment back pressure.

Although it has been recognized that constructive utilization of nacelle compartment air might include aft discharge to recover a portion of the energy of those working medium gases, the heretofore required size of the directed nozzle would have been likely to adversely impact the characteristics of air flow through or surrounding the engine. Additionally, the thrust gain to be achieved by discharging the flow from the heretofore required low back pressure compartment would be expected to be quite small.

It is then that the present invention seeks new techniques for utilization of this nacelle compartment ventilation air in an approach viewing the engine operating system as a whole.

DISCLOSURE OF INVENTION

According to the present invention the nacelle compartment of an aircraft power plant having active clearance control air discharging thereto at altitude cruise conditions is operated at a pressure level on the order of one to two and one-half pounds per square inch (1–2$\frac{1}{2}$ psi) above the pressure of the ambient atmosphere externally of the power plant and is vented through an aft facing compartment vent nozzle.

According to one detailed embodiment of the invention, the aft facing nozzle is an essentially annular opening extending about the periphery of the nacelle compartment. In another detailed embodiment the aft facing nozzle of the turbofan power plant is disposed over a portion of the perimeter of the fan section.

Principal features of the present invention are the pressurized nacelle compartment and the aft facing vent nozzle. Notwithstanding the fact that cooling air for active clearance control is discharged into the pressurized compartment, the pressure within the compartment at altitude cruise conditions is maintained at a level on the order of one to two and one-half pounds per square inch (1–2$\frac{1}{2}$ psi) above the pressure of the atmosphere to which the compartment flow is discharged. In one detailed embodiment exhaust flow from the nacelle compartment is ducted across the fan stream of the engine and discharged to the ambient atmosphere externally of the engine fan section. In another detailed embodiment the exhaust nozzle extends circumferentially about the periphery of the nacelle compartment. The area of the nacelle discharge orifice is sized to provide a compartment pressure of one to two and one-half (1–2$\frac{1}{2}$) psi above ambient at altitude cruise conditions.

A principal advantage of the present invention is increased engine thrust when compared, at a corresponding fuel flow rate, to nonpressurized nacelle operations. The thrust specific fuel consumption is decreased and more economical operation of the engine results. Improvements are obtained with the pressurized nacelle through the optimized balance of thrust increase as a result of directed flow discharge and thrust decreases as a result of lost case cooling effectiveness. Loss in cooling effectiveness at higher nacelle compartment pressures is more than offset by the added thrust component.

The foregoing features and advantages of the present invention will become more apparent in the light of the following detailed description of the best mode for carrying out the invention and in the accompanying drawings.

BEST MODE FOR CARRYING OUT THE INVENTION

Figure 1:
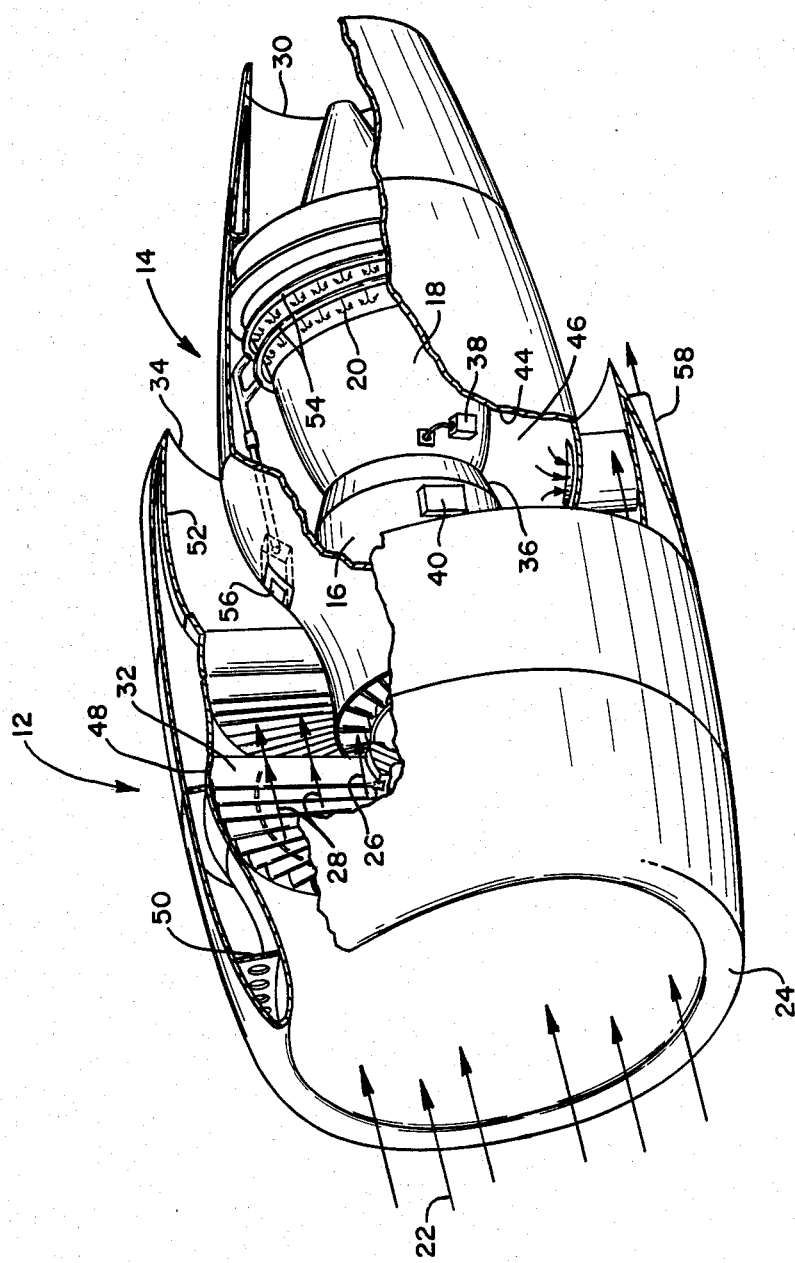
FIG. 1 is a simplified perspective view of a gas turbine power plant with portions of the nacelle fairing broken away to reveal the nacelle compartment.

The present invention is directed to the improvement of overall gas turbine engine efficiency at altitude cruise condition (35,000 ft./Mn 0.8) and is described with respect to the turbofan engine embodiment of an aircraft power plant illustrated in FIG. 1. The engine is principally formed of a fan section 12 and a core section 14. The core section is further subdivided into a compressor 16, a combustor 18 and a turbine 20. Flow 22 approaching the inlet 24 of the engine is divided into a core stream 26 and a fan stream 28. The core stream is directed through the compressor, combustor and turbine and is exhausted from the engine through a core nozzle 30. The fan stream is directed across one or more rows 32 of fan blades and is exhausted through a fan nozzle 34. The engine case 36 circumscribes the compressor 16, combustor 18 and turbine 20. Engine accessories, such as an ignition system 38 and an electronic fuel control 40, are mounted externally of the engine case and are enclosed by a nacelle fairing or cowling 44. The nacelle cowling is formed to a smooth contour offering minimal resistance to fan stream flow and defines with the engine case 36 a nacelle compartment 46. The accessories such as the ignition system and fuel control are, in many cases, cooled with air which is subsequently discharged into the nacelle compartment.

A fan case 48 circumscribes the blades of the fan section 12. Structure 50 extends in the upstream direction from the fan case to form the inlet 24 and structure 52 extends in the downstream direction from the fan case to form, in conjunction with the nacelle cowling 44, the fan nozzle 34.

The engine illustrated is of the active clearance control type and has one or more cooling air manifolds 54 disposed circumferentially around the engine case. Although only manifolds about the turbine 20 of the engine are shown, such manifolds may also be disposed about the compressor 16. Cooling air is supplied to the manifolds, for example, from a port 56 in the nacelle cowling 44 upstream of the fan nozzle 34. Supplied air is directed across inwardly facing orifices in the manifolds and against the engine case at cruise condition to reduce the temperature of the engine case and therewith the diameter of internal case supported seals. Decreasing the diameter of the case supported seals at cruise condition causes the seals to more closely match the diameter of opposing rotor seals at that operating condition. Reduced leakage across the seals results in improved engine efficiency.

During operation at altitude cruise condition (35,000 ft/Mn 0.8) of the power plant thus far described, substantial amounts of cooling air are discharged into the nacelle compartment and are in need of venting therefrom. In addition to cooling air, air leaking between the flanges of adjacent engine cases and air leaking between abutting edges of the nacelle cowling inwardly of the fan section must also be vented from the nacelle compartment. For large engines, such as the JT9D-7R4 turbofan engine, vented flows with active clearance control in operation are on the order of three to four pounds per second (3–4 pps) at altitude cruise. Venting in at least one power plant installation utilizing that engine is achieved by ducting flow to be discharged across the fan stream 28 and thence in an aft direction to the ambient atmosphere through an aft facing vent nozzle 58 at the perimeter of the fan section 12. The nacelle compartment is operated at a pressure level of one to two and one-half pounds per square inch (1–2½ psi) above ambient conditions and the the pressure differential across the aft facing vent nozzle is, accordingly, at that level.

Figure 2:
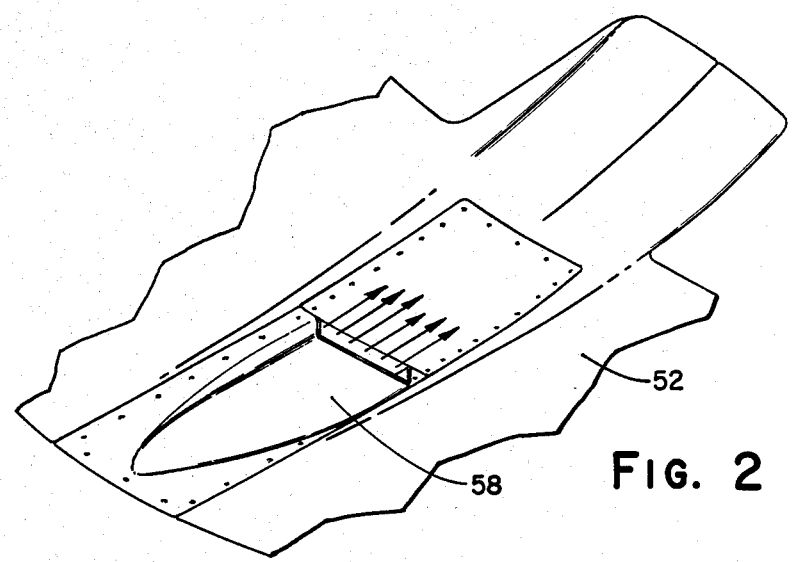
FIG. 2 is an illustration of the nacelle compartment vent nozzle disposed at the perimeter of the fan section.
Figure 3A:
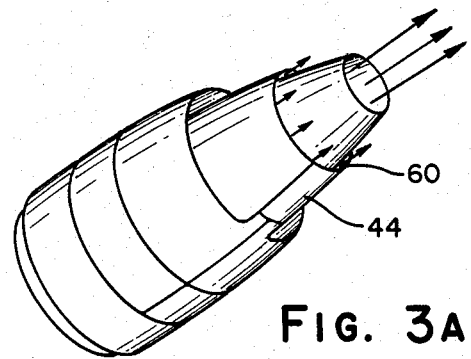
FIGS. 3A and 3B are illustrations of alternate nacelle compartment vent nozzles disposed circumferentially about the perimeter of the aft portion of the nacelle fairing.
Figure 3B:
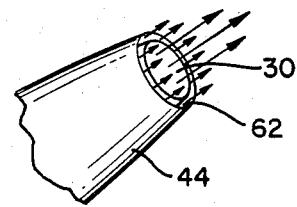

The aft facing vent nozzle 58 at the perimeter of the fan section is shown in greater detail in the FIG. 2 perspective view. Alternate type nozzles are shown in FIG. 3A at a midpoint location 60 along the nacelle cowling 44 and in FIG. 3B at the end 62 of the nacelle cowling 44 in proximity to the core exhaust nozzle 30.

The present invention recognizes not only the added benefit of discharging such flow in a direction augmenting engine thrust, but recognizes the optimized total thrust to be achieved by maintaining the nacelle compartment at a pressurized condition as well.

Figure 4:
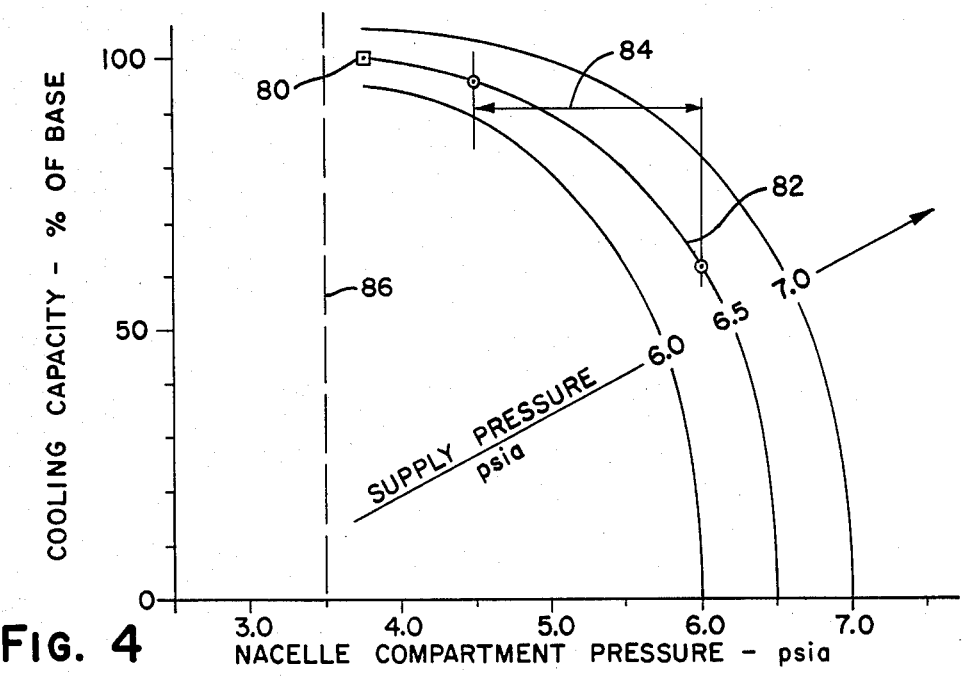
FIG. 4 is a graph illustrating the reduction in cooling capacity of the active clearance control system as a function of increasing back pressure within the core compartment.

The optimized nacelle compartment pressure for a given flow rate is selected in consideration of two factors: the increase in engine thrust as a result of aft directed vent flow and the decrease in engine thrust as a result of lessened active clearance control effectiveness. For example, cooling effectiveness of an active clearance control system as a function of discharge back pressure (nacelle compartment pressure) for an engine such as the JT9D-7R4 is displayed in the FIG. 4 graph. As the back pressure to which the active clearance control manifold discharges is increased the cooling effectiveness, as measured in terms of capacity to remove heat from the engine case, decreases. This is due in large part to reduced discharge velocities as the pressure differential across the manifold is lowered. The rate of cooling capacity for a JT9D-7R4 installation without pressurized nacelle is indicated at a base rate at 80. Reductions of cooling capacity are measured as a percentage of the base rate for increasing compartment pressures but at a constant supply pressure, are indicated along the curve 82. Initial reductions in cooling effectiveness are small; subsequent reductions as the compartment back pressure approaches the supply pressure are large. Within the range 84 of nacelle compartment pressures at one to two and one-half pounds per square inch (1-2½ psi) above the pressure 86 of the ambient atmosphere, reductions in cooling effectiveness are only on the order of 30% or less.

It has been documented that the fuel efficiency improvement achieved through the use of active clearance control with JT9D-7R4 engine models is on the order of a one percent (1%) reduction in thrust specific fuel consumption (TSFC). Reductions in this beneficial effect are shown as curve 90 in FIG. 5 for increasing compartment back pressures. At a compartment back pressure approaching the supply pressure this one percent (1%) improvement is rendered ineffective.

Figure 5:
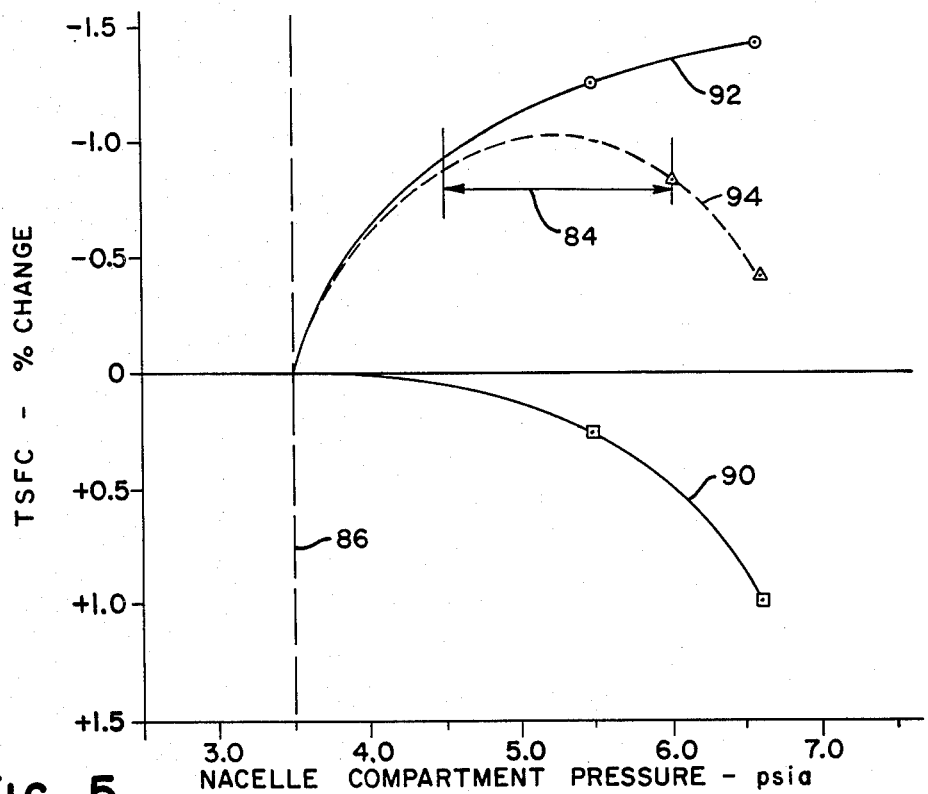
FIG. 5 is a graph showing the change in thrust specific fuel consumption as a function of nacelle compartment pressure.

Also on FIG. 5 is plotted curve 92 which represents the decrease in thrust specific fuel consumption (TSFC) as a result of discharging the compartment vent flow in an aft direction. Discharging the equivalent flow at a higher pressure differential resulting from the increase in compartment pressures indicated produces a decreasing thrust specific fuel consumption. Curve 94 results from plotting the net thrust specific fuel consumption of the combined effects displayed by curves 90 and 92. As can be seen optimum values of thrust specific fuel consumption (TSFC) reduction occur between 4.5 and 6.0 psia compartment pressure or 1-2½ psi above the ambient condition.

It is therefore that through incorporation of the concepts of the present invention gas turbine engines can be operated at higher fuel efficiencies than heretofore achieved in comparable engines.

Although not directly related to engine thrust, operating the nacelle at a higher pressure level has the additional advantage of a lower profile vent nozzle. The cross-sectional area of the vent nozzle designed for a compartment pressure of 1-2½ psi above ambient condition in comparison to a cross-sectional area of a vent nozzle designed for a compartment at or within one-half psi above ambient is substantially smaller. Weight is reduced and the adverse aerodynamic effects of the larger nozzle on the surrounding flow stream is mitigated.

Although the invention has been shown and described with respect to detailed embodiments thereof, it should be understood by those skilled in the art that various changes in form and detail thereof may be made without departing from the spirit and the scope of the claimed invention.

We claim:

1. A method of operating an aircraft power plant installed on an aircraft and of the active clearance controlled type including a gas turbine engine housed within a nacelle compartment and a cooling air manifold extending around the engine including the steps of:
    admitting active clearance control cooling air into said nacelle compartment and discharging the air against the engine;
    maintaining the air pressure within said nacelle compartment at altitude cruise conditions at a level which is on the order of one to two and one-half pounds per square inch (1-2½ psi) above the pressure of the air externally of the power plant;
    discharging air from said compartment in an aft direction relative to the aircraft on which the power plant is installed.

2. The method according to claim 1 wherein the power plant is of the type having an annular fan section at the forward end thereof and wherein the step of discharging said air from the nacelle compartment further includes the step of directing said air to a location at the perimeter of said fan section and thence in an aft direction.

3. The method according to claim 2 wherein said discharged air is directed through a vent nozzle which is sized in relation to the volume of said admitted air so as to maintain the stated pressure level in the nacelle compartment at altitude cruise condition.

4. In an aircraft of the type having a gas turbine engine housed within a nacelle compartment on said aircraft, the improvement comprising:
    an engine case;
    means within the nacelle compartment for discharging cooling air against the engine case at altitude cruise condition to decrease the diameter of the case thereat;
    means for regulating the air pressure within the nacelle compartment including a nacelle compartment vent nozzle through which air is flowable from said nacelle compartment and sized to maintain the air within the nacelle compartment at a level of one to two and one-half pounds per square inch (1-2½ psi) above the pressure of the air externally of the aircraft at altitude cruise condition, the nozzle being oriented so as to discharge nacelle air flowing therefrom in an aft facing direction relative to the aircraft in which the engine is installed.

* * * * *